Figure 7:
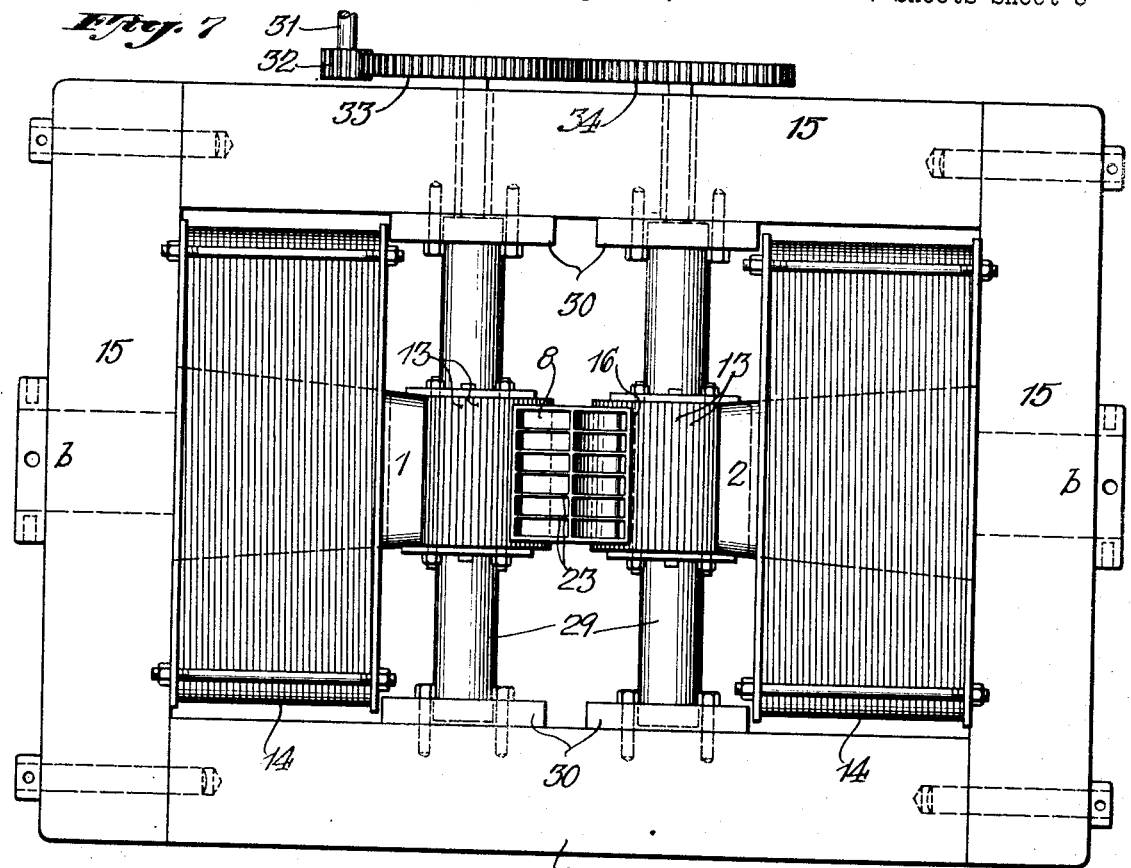

July 27, 1937.  E. E. ELLIS ET AL  2,088,364
ELECTROMAGNETIC SEPARATOR DEVICE
Filed Sept. 22, 1934   7 Sheets-Sheet 1
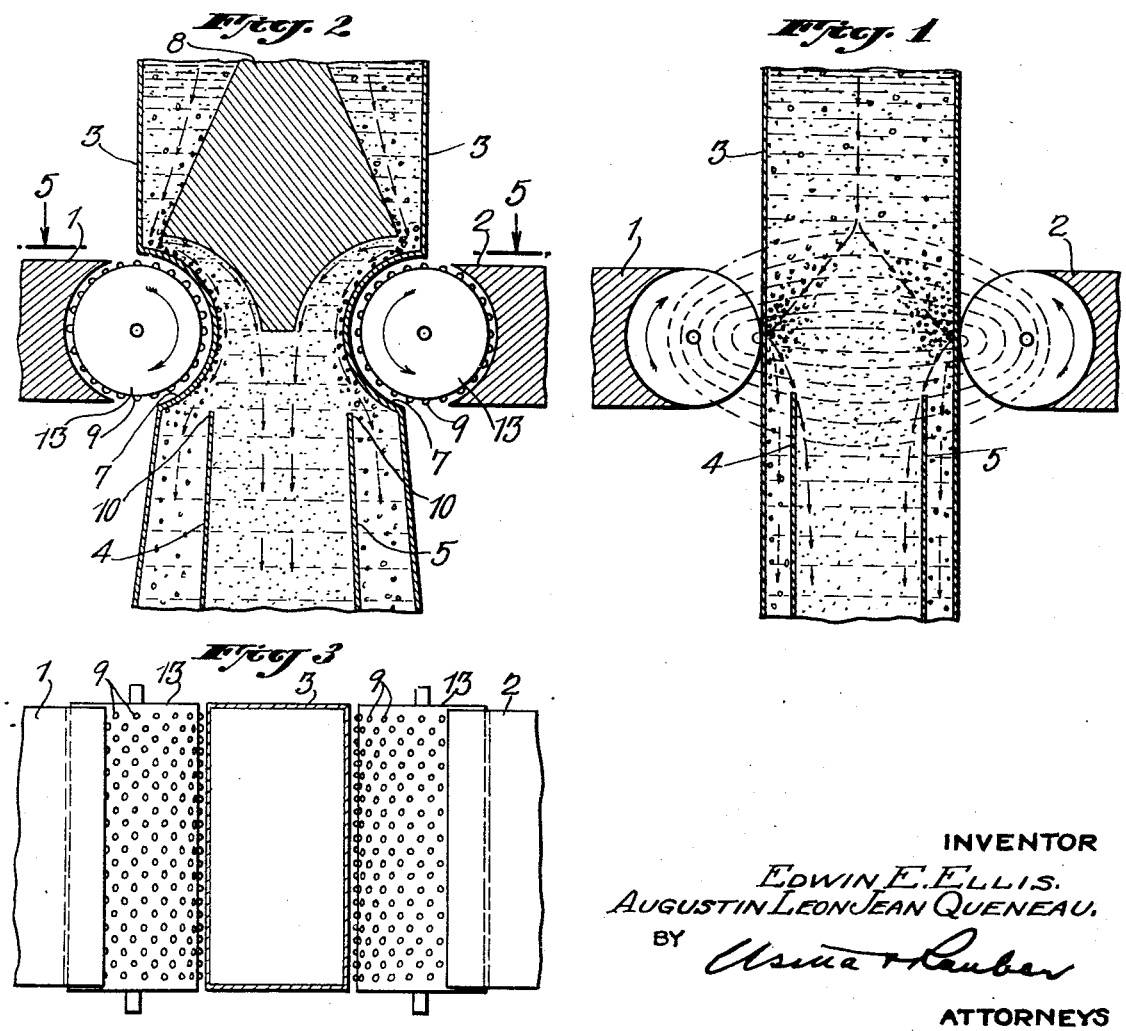
INVENTOR
EDWIN E. ELLIS.
AUGUSTIN LEON JEAN QUENEAU.
BY
ATTORNEYS

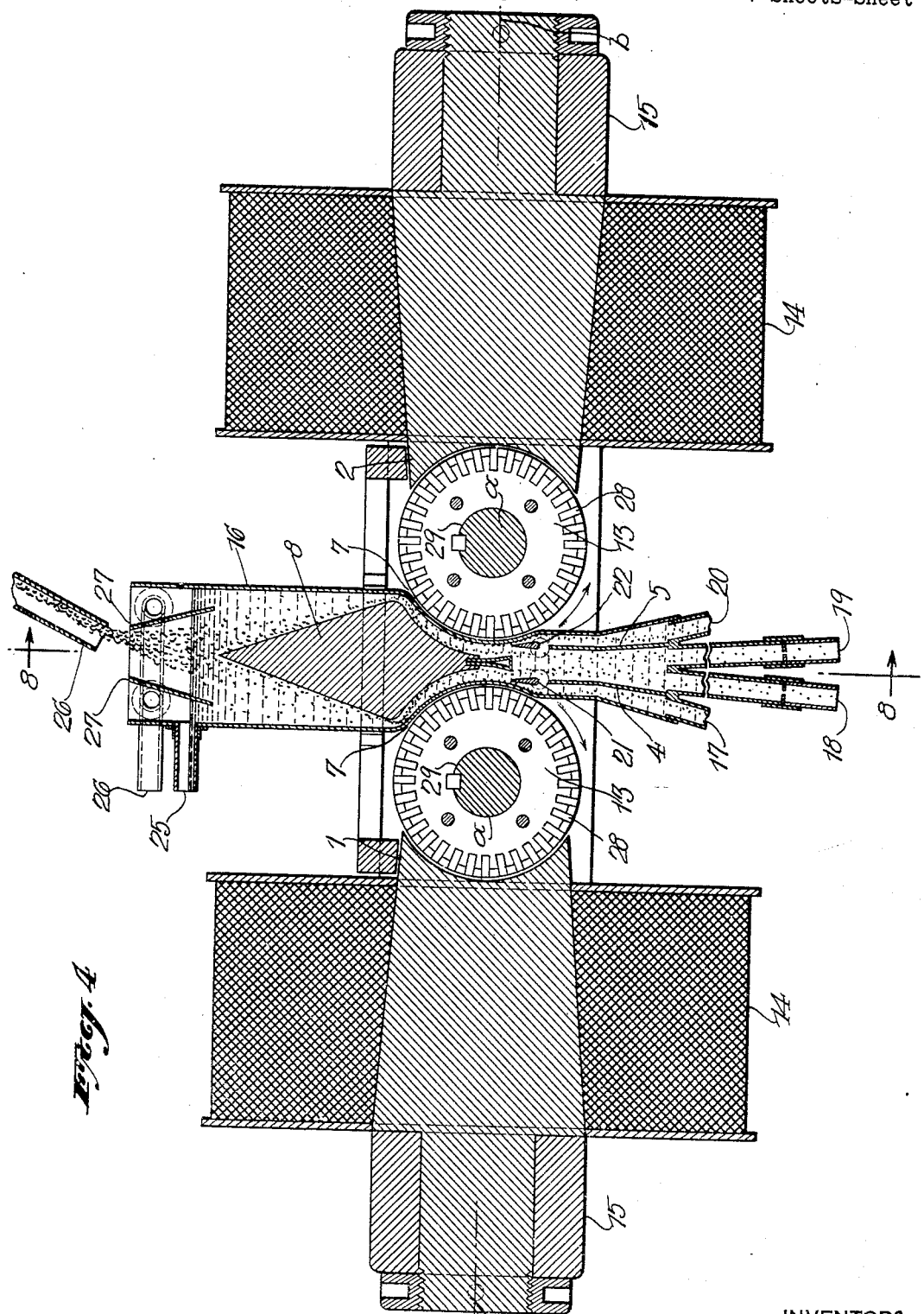

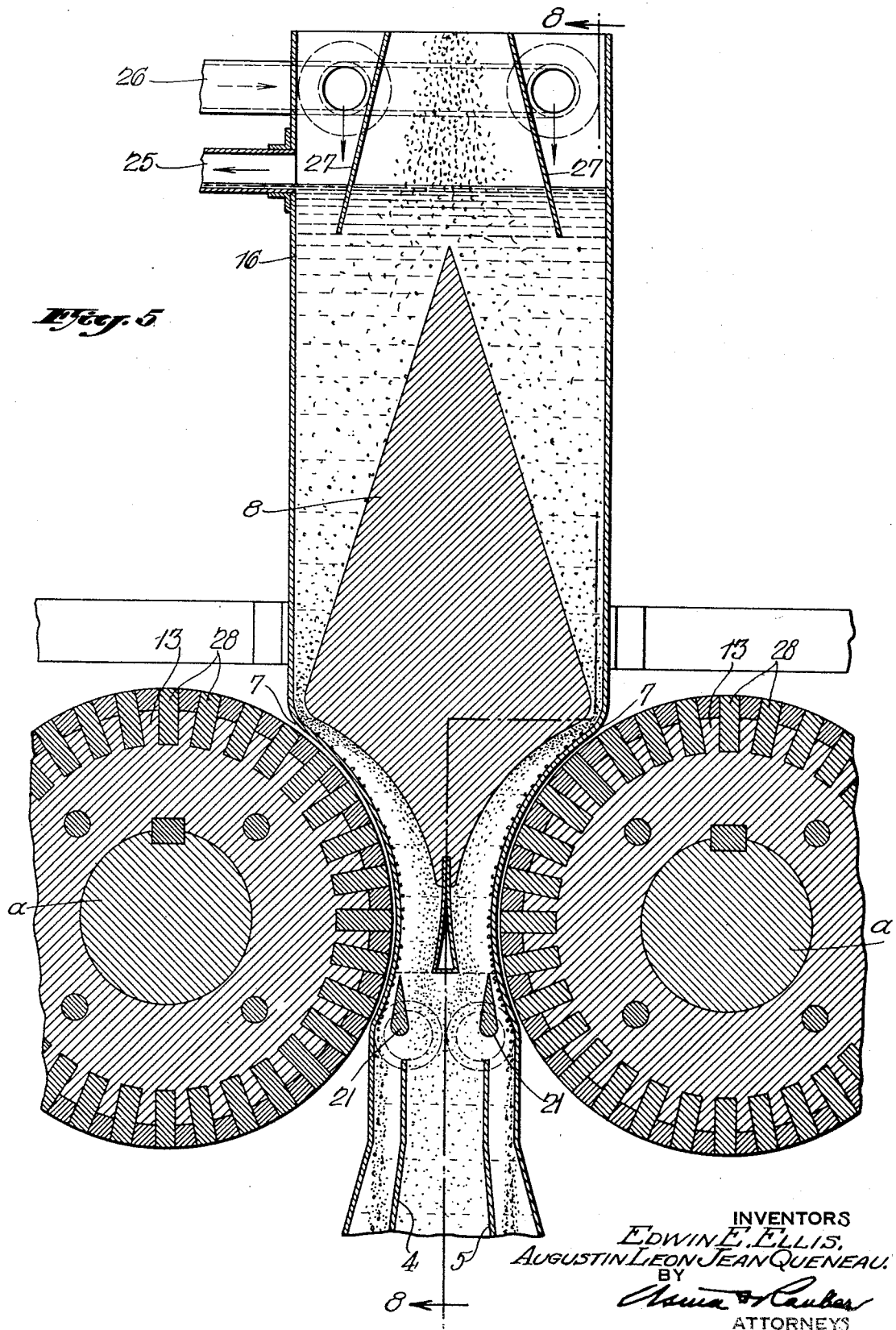

July 27, 1937.  E. E. ELLIS ET AL  2,088,364
ELECTROMAGNETIC SEPARATOR DEVICE
Filed Sept. 22, 1934  7 Sheets-Sheet 4
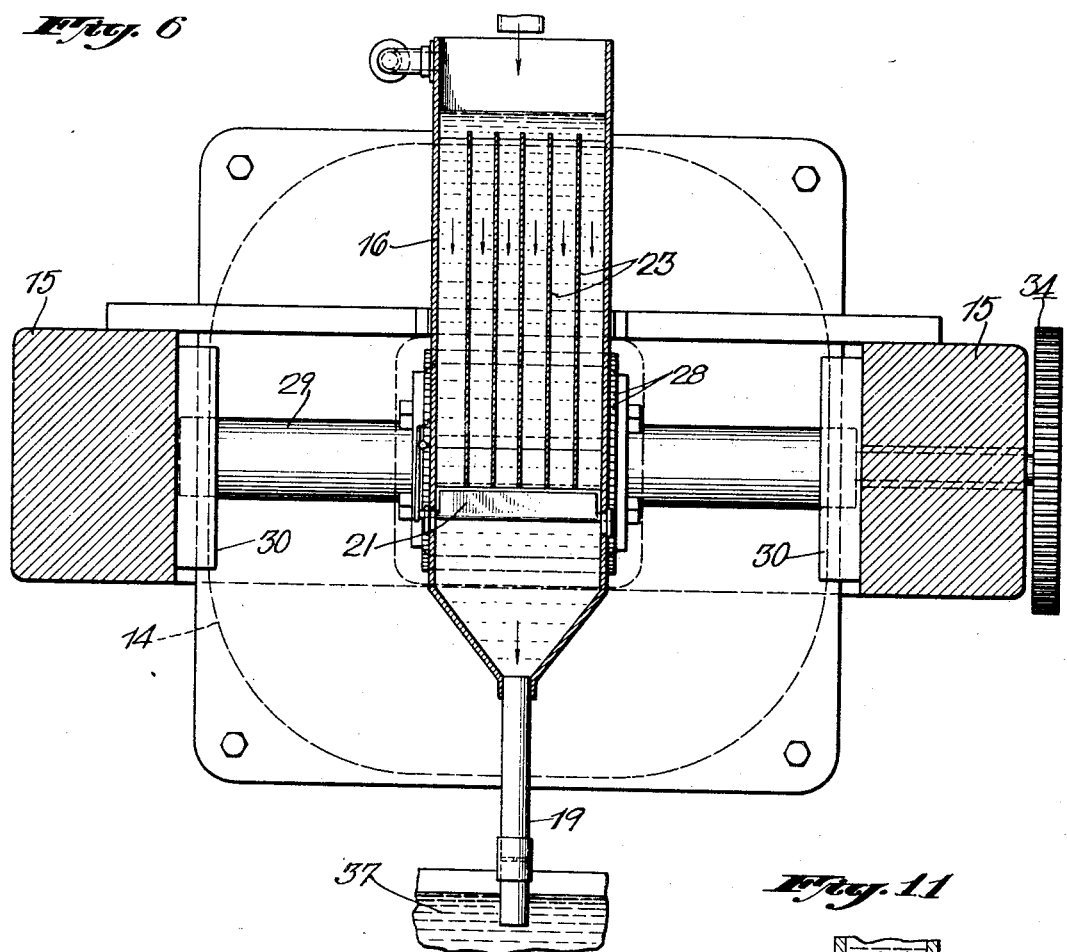
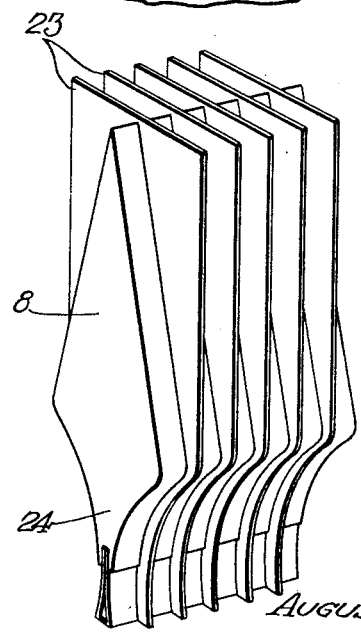
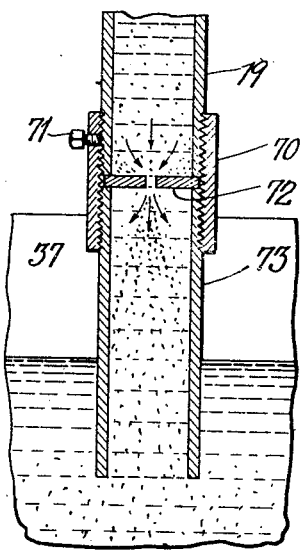
INVENTORS
EDWIN E. ELLIS.
AUGUSTIN LEON JEAN QUENEAU.
BY
ATTORNEYS

INVENTORS
EDWIN E. ELLIS.
AUGUSTIN LEON JEAN QUENEAU.
BY
ATTORNEYS

July 27, 1937.    E. E. ELLIS ET AL    2,088,364
ELECTROMAGNETIC SEPARATOR DEVICE
Filed Sept. 22, 1934    7 Sheets-Sheet 6
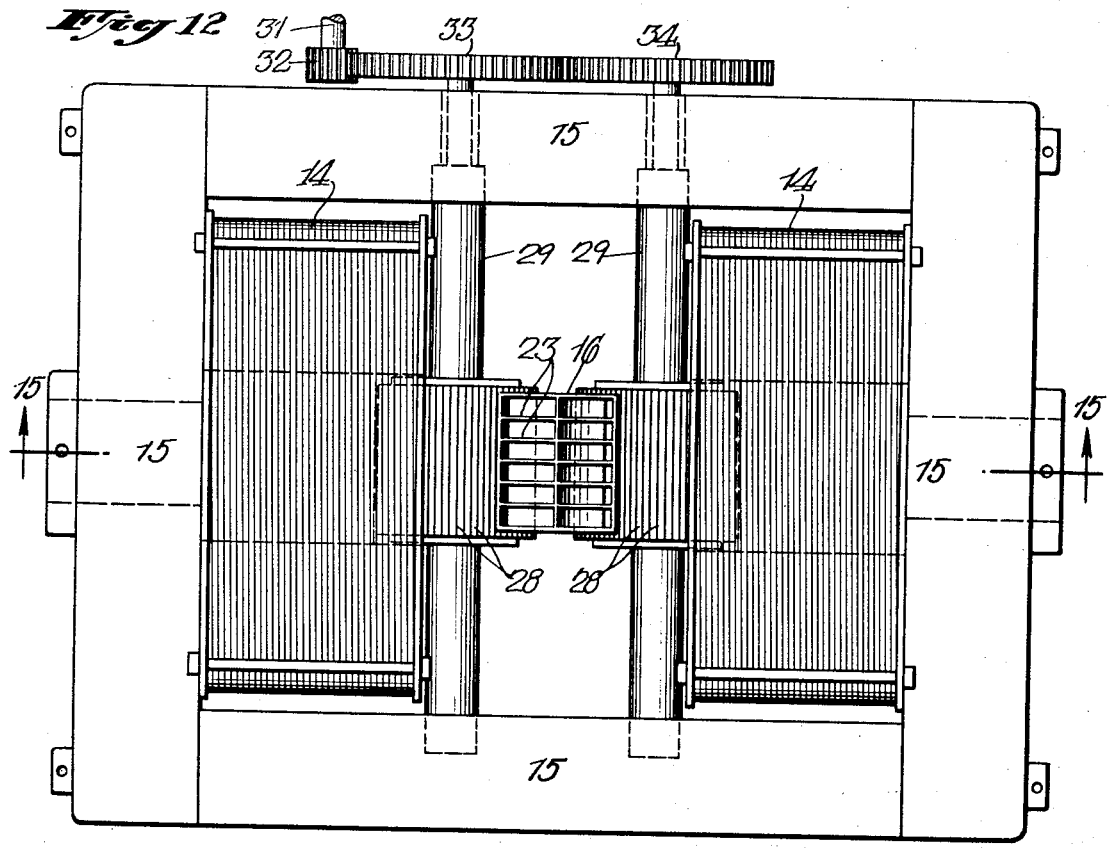
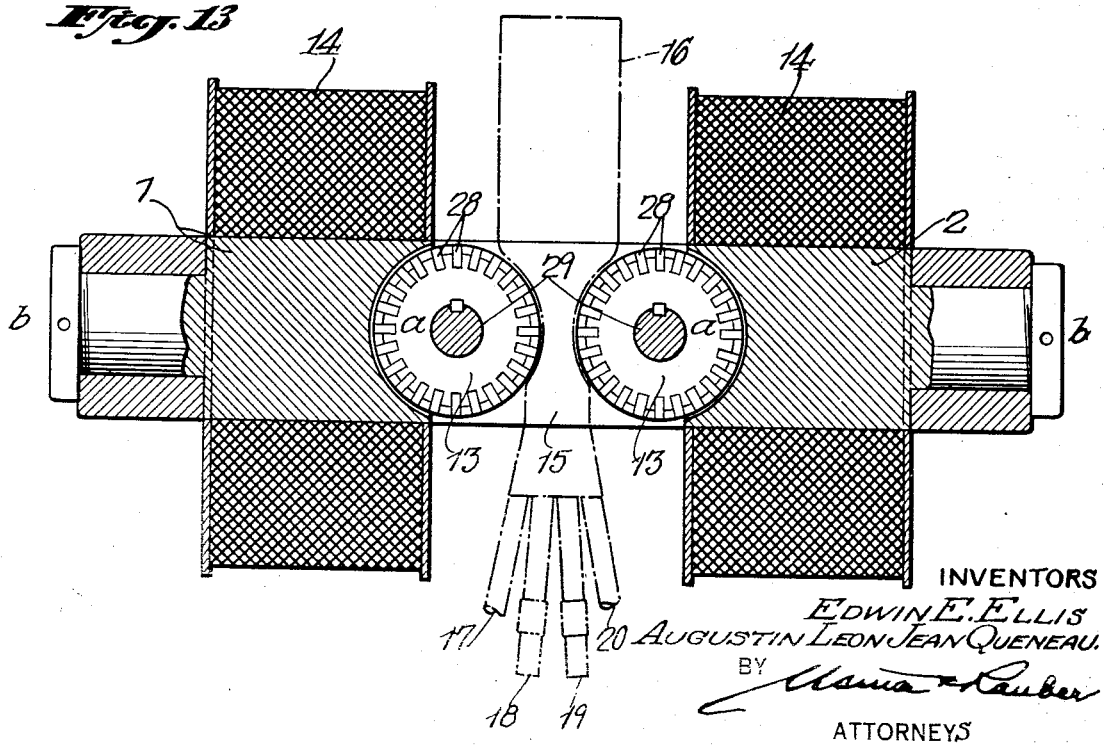
INVENTORS
*Edwin E. Ellis*
*Augustin Leon Jean Queneau*
BY
ATTORNEYS

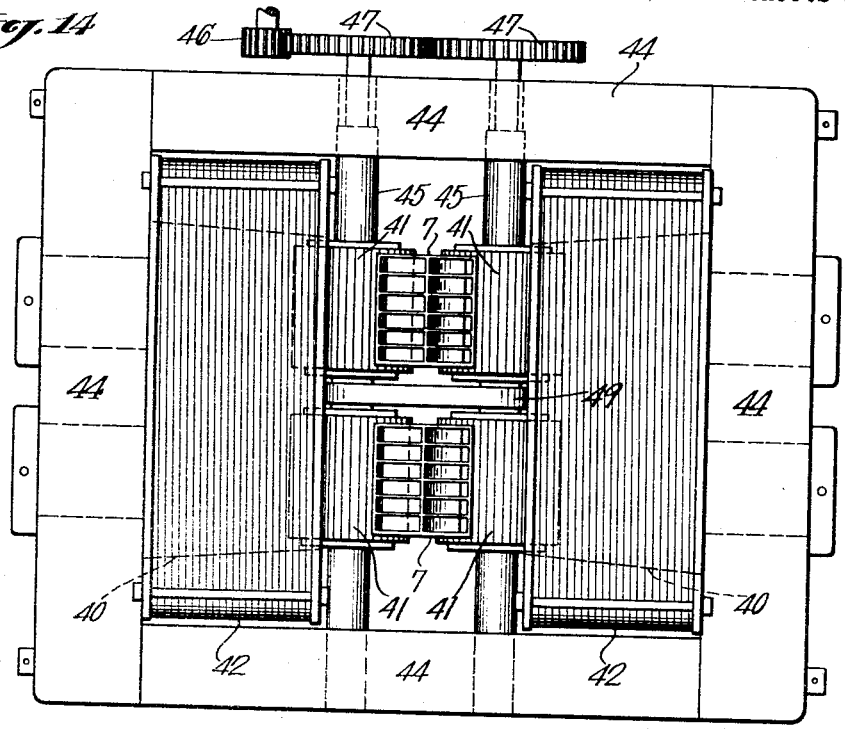
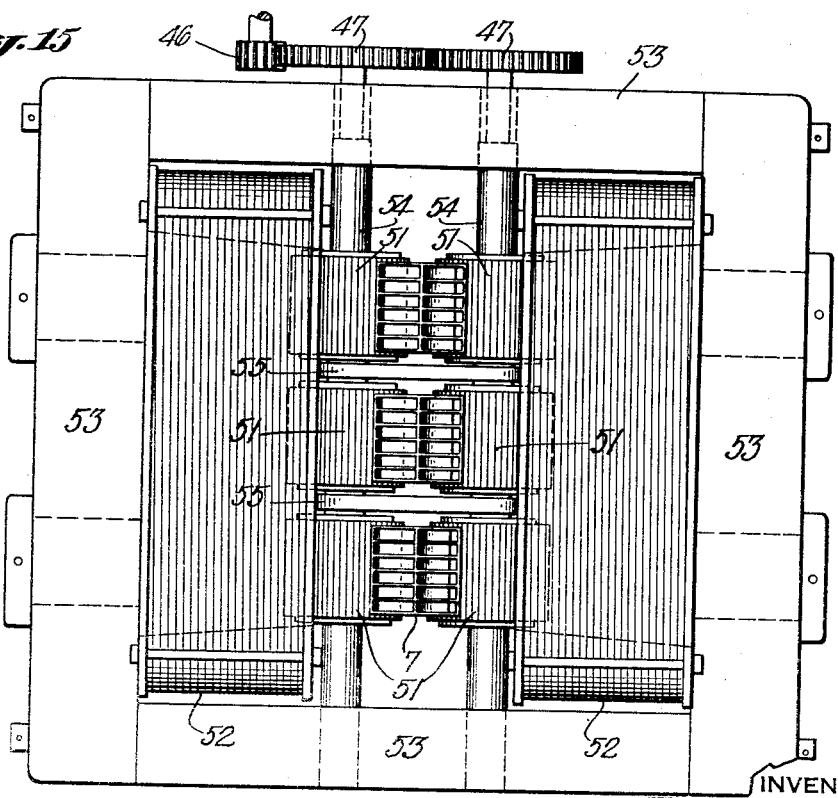

Patented July 27, 1937

2,088,364

UNITED STATES PATENT OFFICE 2,088,364

ELECTROMAGNETIC SEPARATOR DEVICE

Edwin E. Ellis, Short Hills, and Augustin Leon Jean Queneau, Bernardsville, N. J.

Application September 22, 1934, Serial No. 745,116

13 Claims. (Cl. 209—232)

This invention relates to the art of treating materials such as ores, residues, tailings, flue dust and the like to obtain a separation of the metal values thereof from the non-metallic values. More particularly this invention relates to the art of electro-magnetic separating devices.

Heretofore in the art many types of electro-magnetic separator devices have been proposed for use in the treating of various materials to recover or concentrate the metal values therein. These devices have been broadly separated into two types—"wet" separators and "dry" separators. A "wet" separator is one wherein the material to be treated is suspended in a fluid medium such as water. A "dry" separator is one in which the material to be treated is surrounded by an air medium. The present invention relates to "wet" electro-magnetic separator devices.

Heretofore in the art, many different types of "wet" magnetic separator devices have been proposed, but all such devices have been limited in their application to the separation of materials of relatively high magnetic susceptibility.

One of the objects of the present invention is to provide an improved electro-magnetic separator device of the so-called "wet" type.

Another object is to provide a "wet" magnetic separator device adapted to treat materials of relatively low magnetic susceptibility.

Still another object of the present invention is to provide an improved means for electro-magnetically concentrating ores, residues, tailings and the like wherein the metal values are of relatively low magnetic susceptibility.

Another object is to provide a method and means for concentrating iron ores, residues and the like wherein the iron content is present in one or more of the lowly magnetic forms.

Other objects and advantages will be apparent as the invention is more fully disclosed.

In accordance with the above objects, we have devised a novel type of electro-magnetic separator device which is adapted to economically concentrate materials suspended in a fluid medium, particularly materials of relatively low magnetic permeability, of which the following is a full and complete description. Before describing the present invention reference should be made to the accompanying drawings wherein:—

Figure 8:
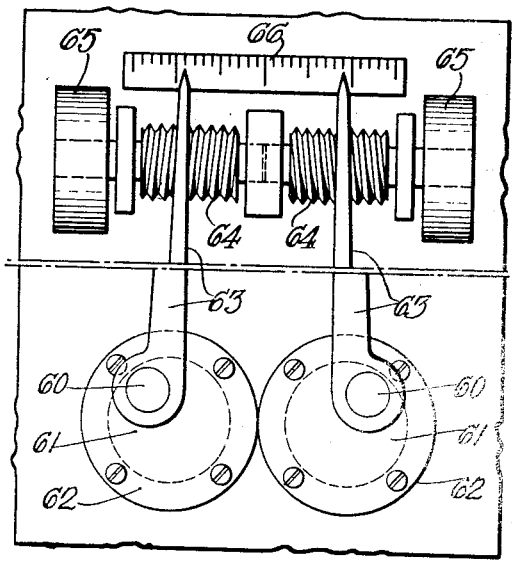
Figure 9:
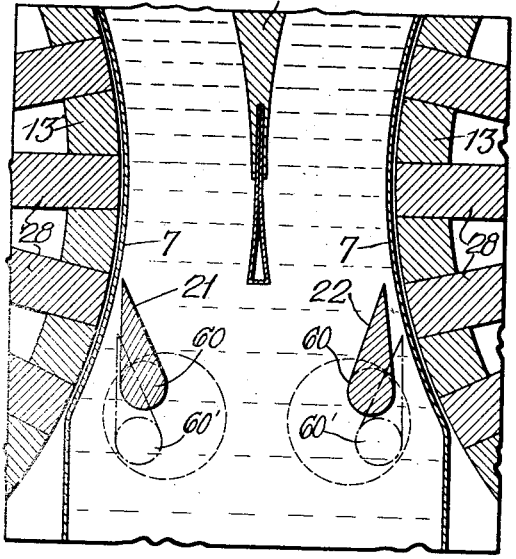

Fig. 1 illustrates schematically the improved result obtained by a rotation of the symmetrical pole ends; Fig. 2 illustrates schematically the improved result obtained by introducing the downwardly flowing suspension of materials adjacent the pole end at the point of weakest flux strength; Fig. 3 is a schematic view along plane 5—5 of Fig. 2 illustrating a further improvement in the rotating pole end; Fig. 4 is a side elevational sectional view of one specific embodiment of the electro-magnetic separator device of the present invention; Fig. 5 is an enlarged sectional plan view of the same; Fig. 6 is a view along plane 8—8 of Fig. 5; Fig. 7 is a top plan view of the form illustrated in Fig. 5; Fig. 8 is an enlarged view in elevation of one of the elements of the present invention; Fig. 9 is an enlarged sectional elevational view of the same; Fig. 10 is a perspective view of another element of the present invention; Fig. 11 is an enlarged section side view of a third element of the present invention; Fig. 12 is a top plan view of a second specific embodiment of the present invention; Fig. 13 is a side elevational view along plane 15—15 of Fig. 12; Fig. 14 is a top plan view of a third specific embodiment of the present invention; and Fig. 15 is a top plan view of a fourth specific embodiment of the present invention.

Referring to the drawings, Figs. 1 to 3 inclusive, the broad principles upon which the present invention is predicated will become apparent.

The present invention in its broadest concept contemplates the provision of a novel type of electro-magnetic separator device adapted to economically treat materials suspended in a fluid medium such as water. The concentration of materials suspended in water offers difficulties and problems not present in the separating of materials in air. The viscosity and inertia of water are forces opposing the free motion of a magnetically attracted particle to the magnetic pole. These forces also oppose the bodily abstraction of a magnetically attracted particle from a suspension. Due to the nature of a suspension, it is impossible to present the material in suspension to a magnetic pole at any desired or fixed distance therefrom, as is customarily practiced in "dry" magnetic separation devices. The greater bulk of material to be treated also is comprised of metal values, the concentrates of which are of relatively low economic value and, therefore, any device to be economically practical must be capable of relatively large tonnage capacity at relatively low cost per ton of recovered concentrates.

Referring to the drawings, Figs. 1 to 4 inclusive schematically illustrate the electro-magnetic separator device of the present invention.

A suspension of materials consisting of magnetic and non-magnetic particles is flowed under hydrostatic pressure in container 3 through a magnetic field maintained between magnetic poles 1 and 2 disposed in a position to project the field through the suspension between opposite side walls of the container 3. The magnetic particles of the suspension are attracted towards the inner surface of the said opposite side walls by the magnetic forces of the field substantially as indicated schematically in Fig. 1.

We have discovered that by rotating the peripheral surface of the pole ends as indicated in Fig. 1 in the direction of suspension flow through container 3 that the thus magnetically attracted particles are progressively carried downwardly along the inner surface of the opposite side walls through the zone of maximum field strength into the zone of lesser field strength, wherein they are dislodged from the wall face and carried away by the flow of the vertically falling suspension.

As the magnetically attracted particles are released adjacent the wall face, by the provision of suitably located means such as partitions 4 and 5, spaced from the wall face, the flow of the suspension after passing through the magnetic field may be divided into three streams, the two outer streams carrying the bulk of the magnetically attracted particles and the center stream carrying the bulk of the non-magnetic particles.

The separation thus obtained by rotating the pole ends is materially improved and facilitated by the structure illustrated schematically in Fig. 2. In Fig. 2, the vertical side walls of the container 3 are provided with arcuate recesses 7—7 into which the rotating pole ends extend. The space gap between the rotating pole ends remaining the same as that arbitrarily selected. In this arrangement, the magnetically attracted particles as they pass through the zone of maximum field strength (lying along the horizontal plane through the longitudinal axes of the poles) are retained upon the inner face of the container and are moved therealong by rotation of the pole and downwardly along the under face of the arcuate recess 7 out of the path of vertically falling suspension. As the particle passes through the weakening magnetic field, it becomes released and carried away into the separate channel of flow provided by appropriately positioned partitions 4 and 5.

As a further improvement, the interior of the upper section of container 3 may be divided into two substantially equal halves by means 8 and the flow of the suspension in each half may be directed to the container wall at the point of intersection therewith of the top of the arcuate recessed section. The depth of the arcuate section 7 may be such that at this point, the suspension enters the magnetic field between poles 1 and 2 in a zone of minimum field strength and then projected inwardly towards the center of the space gap between the poles.

In this manner, the non-magnetic particles are thrown away from and the magnetic particles by attraction are held adjacent to the arcuate inner wall face of the container 3. The magnetic particles are carried along the arcuate wall face by rotating the pole and through the zone of maximum field strength into the lower zone of weaker field strength, thence into the two outer streams of flowing suspension, as hereinabove described. The non-magnetic particles tend to be concentrated in the middle stream of the suspension.

In any device incorporating this basic principle it is advisable to provide, upon the rotating periphery of poles 1 and 2, a plurality of points 9 of flux concentration, to insure the attraction of the magnetic particles against the inner arcuate face of container 3. In the provision of these points of flux concentration, cognizance must be taken of the fact that theoretically the fluid suspension of materials traversing the container is a substantially uniform dispersion of magnetic and non-magnetic particles throughout its cross-sectional area.

By means of the magnetic field strength, the magnetic particles are attracted towards the inner faces of the arcuate section of container 3 and concentrated thereby into the two outer streams of the suspension leaving the magnetic field. With any given spacing of points along the pole periphery in a horizontal plane, the space intermediate these points permits non-magnetic material to flow uninterruptedly along the arcuate inner face and to mix with the magnetic particles in the two outer streams. Therefore, the relative proportion of such magnetic and non-magnetic particles in each outer stream may be regulated by appropriate regulation of the spacing of the points of magnetic flux concentration upon the face of the rotating periphery of the poles.

A further regulation of the relative proportion of magnetic to non-magnetic particles may be obtained by the proper positioning of the upper edge 10 of the partitions 4 and 5, with respect to the spacing of the said edges from the inner wall face and the distance the edge is located below the zone of maximum field strength. As a general principle, the upper edge of the partition should not be located interiorly beyond a plane vertically tangent to the inner face of the arcuate section of container 3 at the point of maximum field strength. The spacing of this edge from the container wall may be widely varied depending upon the character of the material being treated (such as particle size, magnetic permeability, the rate of flow of the suspension through the container, the magnetic field strength, etc.). It is preferable to make the upper edge 10 of partitions 4 and 5 adjustable as will be more fully hereinafter described.

As a further basic improvement feature, poles 1 and 2 are substantially rectangular in cross-section and pyramidal in longitudinal section, the smaller end of the pole being arcuately recessed about an axis lying parallel to the largest diameter of rectangular cross-section permitting a cylindrical rotatable pole end 13 to be inserted therein with relatively a small space gap therebetween. The peripheral surface of the rotatable pole end is provided with a plurality of spaced points 9 comprised of material of relatively high magnetic saturation to obtain the desired points of flux concentration.

The cross-sectional area of poles 1 and 2 may be widely varied without departing essentially from the present invention, depending upon the nature of the material to be treated, the desired capacity of device, and the like factors.

The space gap between the rotatable pole ends 13 also may be varied widely without departing essentially from the present invention depending upon the same factors.

The precise pyramidal angle of the pole pieces may also be varied widely, as may also the length from pyramidal base to rounded end. The precise dimensions of the pole pieces may be arbitrarily selected to meet any estimated tonnage treating capacity demand. In the construction of the electro-magnet, we prefer to follow the general principles heretofore disclosed with respect to the construction of the magnet for experimental test purposes in Paris, France, the details of which have been published in The Comptes Rendus, French Academy of Sciences, July 9, 1928.

Essentially, this electro-magnet comprises a relatively short, thick and tapered co-axial pole piece with the electro-magnetic coil co-axial therewith and substantially enclosing the entire length of the pole with the coil turns running normal to the pole length and close coupled therewith. The smaller ends of the poles are spaced apart the desired distance to obtain a determined magnetic gap and the opposite larger ends of the poles are electrically connected together by a yoke forming two closed paths of travel for the electromagnetic flux in opposite directions. The magnetic permeability of the path and the flux carrying capacity thereof is such as to reduce energy losses by dissipation through the surrounding atmosphere to a relatively low minimum. The major energy losses encountered in such a magnet structure is in the transmission of the flux through the medium in the magnetic gap between the spaced smaller pole ends. A concentration of magnetic flux upon the spaced pole ends is obtained through the tapering of the pole from the yoke end to the smaller spaced end. The spaced ends of the poles may be plane surfaced, rounded or knife-edged.

A magnet constructed in accordance with these principles provides for a greater flux concentration upon the pole ends with minimum losses into the surrounding atmosphere than in any magnet heretofore proposed. By limiting the pyramidal length of the pole piece to that necessary to permit rotation of the cylindrical end, thus bringing the rotating axis of the said end substantially flush with the sides of a magnetic coil about said pole piece, the best results from the standpoint of magnetic flux generation and flow between spaced pole pieces may be obtained. By proper control of the magnetizing current energizing the coil, the field strength may be readily regulated to any desired figure.

The space gap between the poles 1 and 2 is also subject to wide variation depending upon estimated or desired results. It may be noted that by providing pole pieces that are rectangular in section and by providing a rotating cylindrical end thereon having a rotating axis lying parallel to the axis of widest rectangular diameter, we thereby obtain between the spaced pole ends a rectangular area through which to vertically flow the suspension of materials to be treated. By a suitable regulation of the dimension of this area and the rate of flow of suspension through this area, any desired capacity may be obtained. Suitable regulation of the rate of flow of the suspension may readily be obtained by appropriate selection or regulation of the outlet openings in the bottom of the container 3 in each of the three compartments and by maintaining in the container a substantially constant hydrostatic head by means of appropriately disposed and controlled overflow gates and further by appropriate regulation of the rate of feed of the suspension to the container 3.

We have further found that the mean free path of horizontal movement of the particles of the suspension should be limited and therefore divide, as will be more fully hereinafter disclosed, the flow of the suspension into a plurality of vertical paths of travel into the zone of maximum field strength.

In view of the above description it is believed apparent that the broad principles of the present invention may be widely modified to adapt the same to the treatment of any particular iron ore, concentrate, tailing product, flue dust, residue and the like. We will therefore describe as a specific embodiment of the same the specific details of the device which has been designed for the electro-magnetic concentration of iron containing materials in which the iron content is present as the more lowly magnetic compounds hematite, limonite, etc.

There are large ore bodies containing iron as hematite, limonite and the like compounds of relatively low magnetic permeability. There is usually associated therewith sufficient gangue material to render the ore unsatisfactory for the purpose of direct reduction to pig iron, either because an inordinate amount of fluxing materials must be used therewith or because of the relatively low grade (Fe content) a prior concentrating step must be applied thereto. The costs in each case render the ore a poor competitor with respect to other iron ores of richer iron content or of ores wherein the iron is present as magnetite which is more readily treated by known concentrating methods. In accordance with the objects of the present invention we have devised and provided a method and means for concentrating such ores to obtain a concentrate product at a cost placing such concentrate in competition with the richer iron ores or magnetite ores heretofore preferred by iron and steel producers.

Referring to the drawings Figs. 4 to 12 inclusive, a device suitable for the treatment of iron ores is illustrated in which a symmetrical magnetic field is obtained between spaced pole pieces 1—2 which are rectangular in cross-section and pyramidal in longitudinal section, and which are provided with symmetrical rotatable ends 13—13 having an axis of rotation $a$—$a$ lying in a horizontal plane normal to the longitudinal horizontal axis $b$—$b$ of poles 1—1.

A magnetic field of desired intensity is obtained by means of electro-magnetic coils 14—14 disposed about said poles 1—2 and yoke 15 is provided to concentrate the magnetic flux along a closed path of relatively high permeability. The desired intensity of flux is obtained by suitable regulation of the ampere turns of coils 14—14 and by the current input thereto. To reduce energy losses and to provide for the concentration of the flux of the pole ends, poles 1—2 are rectangular in shape and are tapered towards said ends substantially as indicated, the precise taper angle and the rectangular length of the poles being selected with respect to the pole end area desired, the intensity of the electro-magnetic field desired and other factors.

The intensity of the magnetic field to be established between rotating pole ends 13—13 is primarily dependent upon the magnetic permeability of the material to be treated and the magnetic gap between the spaced pole ends. The magnetic gap for the purpose of the present invention has arbitrarily been selected as about 2 by 8 inches. This gives a capacity suitable for purposes of commercial adaptation of the present invention in the treating of hematite ores. We have found that a magnetic field intensity approximating 10 to 20 kilo. gauss generally is required for such ores for approximately a 2 inch magnetic gap. This field intensity may be varied widely from this approximate value with variation in one or more other factors, such as the density of the suspension, the relative proportion of magnetic to nonmagnetic particles therein, the rate of flow of the suspension through the gap, particle size and size of magnetic gap. Each of these factors must be coordinated one to the other to bring about the desired result of the present invention.

As above set forth, we have found that in passing a fluid suspension of materials through a symmetric field of suitable intensity each pole end magnetically attracts materials. As the force of attraction varies with respect to the distance of the material from the face of the pole, the time interval of exposure to the magnetic field and the magnetic permeability of the material, it is essential that in passing a fluid suspension of materials through the magnetic field and through the magnetic gap that means be provided to control these factors. Means are provided therefor to limit the distance from the face of the pole to which any particle of material flowing vertically past the pole may travel; means are also provided to limit the mean free path of motion of any particle laterally in directions transverse to the direction of fall, except towards the pole; and means are also provided to control the time interval of exposure of the particle to the influence of the magnetic field.

Separator box 16 which is an adaptation of container 3 of Figs. 1 to 3 inclusive is designed to include each of these said means and is vertically supported in a plane normal to the horizontal, longitudinal axis of the poles 1—2. The upper section of separator box 16 has a width substantially equal to the rectangular width of the rotating pole faces 13—13 and a depth materially greater than the magnetic gap between said faces, the middle section side faces of the box being curved inwardly to form arcuate recesses 7—7 into which the pole faces 13—13 extend into relative close proximity. The bottom section of the separator box 16 is of lesser width than the upper section, and is provided with valved outlet openings 17, 18, 19 and 20 in the bottom thereof and a pair of upwardly extending partitions 4 and 5 terminating in adjustable gates 21 and 22 lying substantially in a vertical plane normal to the horizontal axis of the poles. Vertical partitions 4 and 5 are equispaced from the center of the said gap a distance approximately equal to the said gap and separate the bottom section of box 16 into three separate compartments, the two outside compartments receiving the magnetically deflected material passing through gates 21 and 22 and the center compartment receiving the non-magnetic material.

The interior of the upper section of the box 16 is divided by means 8 (Fig. 10) into symmetrical halves which halves are further divided into a series of vertical channels by fins 23. The lower part 24 of means 8 extends downwardly and the outer faces thereof are curved inwardly dividing the arcuate section 7—7 of box 16 into two compartments for a distance at least beyond the longitudinal axis b—b of the poles 1 and 2 representing the horizontal center of the magnetic field. The curved faces of part 24 serves as a means to limit the maximum distance away from the pole face that any one particle may travel in vertically falling through the magnetic gap, and for ready adjustment may be made replaceable substantially as indicated.

The height of box 16 above arcuate section 7—7 is selected with respect to the hydrostatic head of fluid suspension which is desired. The rate of flow of the fluid suspension from box 16 through arcuate section 7—7 and thence into lower partitional section is controlled by means of valved openings 17 to 20 inclusive. Means such as overflow conduit 25 and water intake conduit 26 are provided to maintain a constant head of fluid in container 16. Means 26 to feed the fluid suspension into box 16 also is provided and baffle means 27 may be provided, if desired, to ensure equal distribution of the suspension to each half of the upper section of box 16.

The flow of fluid suspension in box 16 is first directed by means 8 towards the upper edge of curved sections 7—7 on each side of means 8 through the vertical channels formed by fins 23, and the direction of flow of the suspension then is abruptly changed inwardly thus creating a marked centrifugal action at a point where the suspension enters the magnetic field. The magnetically permeable material of the suspension is restrained from departing away from the curved face of the container section 7—7 by the magnetic field strength, although the fluid viscosity, fluid inertia and the sweep of the associated non-magnetic particles may tend to dislodge the magnetic particles from the inner face of curved surfaces 7—7 or to prevent them from lodging there. The non-magnetic material tends to be projected inwardly away from the face of the curved sections 7—7. However, as the rate of flow of the suspension and the rate of rotation of the periphery of pole ends 13—13 are substantially identical, the magnetic particles are deflected towards the pole face and against the inner face of the curved section 7—7 irrespective of the factors of fluid viscosity and fluid inertia provided the time interval of exposure is sufficient and the intensity of the magnetic field great enough. The thus magnetically deflected particles are carried along the curved face 7—7 by the rotation of pole ends 13—13 to a point beyond gate means 21 and 22 into a magnetic field of lesser intensity wherein the flow of water tends to dislodge the particles and to carry the same downwardly out of the magnetic field thereby collecting and segregating the magnetically deflected particles in the outside compartments formed by partitions 4 and 5 while the non-magnetic particles fall substantially vertically into the center compartment.

As is customary in the art it is preferable to provide means to concentrate the lines of force of the electro-magnetic field upon a plurality of points on the rotating pole and sections 13—13. This may be most conveniently done by providing a plurality of inserts 28 of relatively high magnetic saturation about the rotating periphery of the pole ends. As a specific embodiment of this I have shown these inserts as being rectangular bars recessed within the face of the rotating end the said bars extending the rectangular length of the said end. It would not involve a substantial departure from the present invention to alternatively employ a plurality of spaced stud inserts 9 as indicated in Fig. 3 or to provide the said end with a plurality of sharp points or edges as has heretofore been employed in the art.

The pole ends may be rotated in any convenient manner. As shown (Fig. 7), however, I prefer to key the said ends to a shaft 29 which is supported at opposite ends in bearings 30 carried by yoke 15. Means including drive shaft 31, drive gear 32 and meshed driven gears 33 and 34 are provided to rotate the shaft 29 in a manner heretofore known in the art.

In operation, the method of the present invention consists in the steps of grinding the hematite ore to a size passing a 40 to 100 mesh screen, the precise size depending upon the particle size essential to insure separation of the hematite from associated gangue impurities, classifying the ground ore to relatively uniform particle size by eliminating the slime and oversize particles and then forming a pulp or suspension containing from 2 to 4 parts water to 1 part of thus classified ore. The pulp is then passed in a continuous flow into the upper section of container 16, thence through the symmetrical magnetic field projected through the arcuate 7—7 section of container 16, thence into the lower compartments defined by partitions 4 and 5, through valved outlets 17 to 20 inclusive into settling tanks 27.

The rate of flow of the pulp through the device may be varied widely without departing essentially from the present invention as may be readily appreciated. We prefer to rotate the pole ends 13—13 at a rate approximately that producing a peripheral rate of travel approximating the rate of flow of the suspension, although this rate may be higher or lower without essentially departing from the present invention.

Referring to Figs. 12 and 13, a modified structure suitable for the purposes of the present invention is shown. Rotatable end sections 13—13 are disposed as far within coils 14—14 as is practical, thereby shortening the poles 1—2.

In the modification illustrated in Fig. 14, we have indicated a design of separator device which is adapted to increase the treating capacity of the separator device without introducing constructional weaknesses. Wide and relatively narrow rectangular poles 40 are each provided with rotatable ends 41 divided into two sections mounted on a non-magnetic shaft 45 with energizing coils 42 assembled therearound substantially as indicated. The opposing rotatable pole ends 41 are mounted in desired spaced relation to obtain any desired arbitrarily selected magnetic gap therebetween. Non-magnetic bearing support members mounted on yoke 44 in a manner heretofore described with respect to Figs. 4 to 13 inclusive support the opposite ends of non-magnetic shafts 45 to which the rotatable ends 41 are keyed. Non-magnetic link member 49 is provided with bearing surfaces to minimize the bending of the shafts 45 under the influence of the intense magnetic field. Two separator boxes 16 are provided which are substantially identical to that heretofore described with respect to the modification of Figs. 4 to 11, and means including meshed drive and driven gears 46 and 47 are provided to rotate the shafts 45 in substantially the same manner as heretofore described.

In the modification illustrated in Fig. 15, we have indicated a further modification giving a still greater increase in treating capacity. Wide and relatively narrow rectangular poles 50 are each provided with three spaced rotatable ends 51 and with energizing coils 52. The opposing rotating pole ends 51 are assembled in desired spaced relationship to obtain any desired arbitrarily selected magnetic gap therebetween. Non-magnetic bearing support members mounted on yokes 53 in substantially the same manner as heretofore described with respect to Figs. 4 to 11 inclusive are provided for each end of non-magnetic shafts 54 to which the rotatable pole ends 51 are keyed, and intermediate the spaced rotatable ends 51 non-magnetic link members 55 are provided to minimize the bending of the said shafts 54 by the magnetic pull on pole ends 51. Means 46 and 47 are provided to rotate shafts 54 as heretofore described in the first specific embodiment of the present invention.

Referring to Figs. 8 and 9, the features of the adjustable skimming gates 21 and 22 of the present invention may be noted. The ends 60 of the gates 21 and 22 extend through the side wall of the separator box 16 and are each rotatably mounted off center in a rotatable collar 61 and means 62 are provided to fixedly position said collar 61 on the said side wall. By rotating the collar 61 the gates 21 and 22 may be raised or lowered within the limits indicated in Fig. 9 where 60' shows the low position and 60 shows the high position. Means are provided to regulate the spacing of the upper end of the gates from the curved inner face 7—7 of box 16, which means comprises essentially a pointer member 63 keyed to each extending end of the shafts 60, the ends of the pointer 63 being meshed in any convenient manner with rotatable screw threads 64. By rotating the screw threads 64 by means 65 in either direction the shaft 60 thereby is rotated moving the upper edge of the gates 21 and 22 towards or away from the inner face of curved wall 7—7. By means of scale 66 a precise control of the spacing of the upper edge of the gate may be obtained.

A convenient manner of regulating the flow of fluid suspension through valved openings 17 to 20 inclusive is illustrated in Fig. 11. Ordinarily it is difficult to regulate the flow of a suspension through a valve due to the lodging of particles of material within the valve thus obstructing the opening and closing of the valve, or partially clogging the set opening.

In the regulating means shown in Fig. 11 we provide a threaded union 70 adapted to be threaded on the bottom of outlet 17, 18, 19 or 20 and affixed thereon by set screw 71. A washer 72 is provided having a center opening of known diameter which is inserted in the position indicated across the bottom of outlet 19 and retained therein by threaded pipe member 73. By selecting a proper size opening in washer 72 any desired rate of flow of suspension from outlet 19 will be obtained with any given head of fluid thereabove, and the opening will not readily clog up. Moreover, if the opening is made larger by abrasion the washer may be readily replaced.

Having broadly and specifically described the present invention and illustrated and described three specific modifications thereof, it is apparent that many modifications and departures thereof may be made without departing essentially from the same, and all such modifications and departures are contemplated as may fall within the scope of the following claims.

What we claim is:

1. Apparatus for the electro-magnetic separation of materials comprising a pair of electro-magnetic poles, one end of each of said poles being provided with an arcuate recess, a pair of cylindrical end pieces adapted to seat in said recesses, and adapted to form a substantial continuation of the said pole, the surface of said end pieces being provided with a plurality of points of relatively high magnetic flux concentration, means to sustain said poles in a horizontal plane, with the pole axes in substantial alignment and with the said end pieces in adjacent but spaced relation and with the axes of said end pieces lying in a horizontal plane normal to the pole axes, means to rotate said cylindrical end pieces about said axes in clockwise and counter-clockwise motion in a direction towards each other and downwardly, means to circulate a suspension of said material under hydrostatic head of pressure vertically downward in the space gap between said end pieces and out of direct contact with said end pieces, means to establish a magnetic field of determined strength between said poles across the space gap between said end pieces, and means to separate said suspension into three streams as it passes out of the said field, two of said streams carrying the suspension next adjacent said pole end pieces and the third carrying the suspension intermediate the first two streams.

2. Apparatus for the electro-magnetic separation of materials comprising a pair of electro-magnetic poles, one end of each of said poles being provided with rotatable end pieces and each of said end pieces being symmetrically shaped, coil windings about each of said poles, means to sustain said poles in horizontal axial alignment with the said pole ends adjacent each other but with a space gap therebetween and with the rotating axes of the same lying horizontally and normal to the pole axes, means to form a substantially closed magnetic circuit about said poles and electrically connected to the outer ends of the poles and the said circuit lying in a substantially horizontal plane, means to circulate a suspension of said materials under hydrostatic pressure vertically downward through the space gap between said pole ends but not in direct contact with the said pole ends, an electric circuit including said coils to establish a magnetic field of desired intensity between said pole ends, means to rotate said pole ends in clockwise and counter-clockwise direction towards each other and downwardly, and means to separate the said suspension into three streams as the said suspension passes out of the said magnetic field, said streams comprising a center stream and two outer streams, each of said outer streams carrying the suspension flowing next adjacent a pole end.

3. Apparatus for the electro-magnetic separation of materials comprising a pair of electro-magnetic poles one end of each of said poles being provided with a rotatable cylindrical end piece, each of said end pieces being of substantially the same size, means to sustain said poles horizontally in axial alignment with the said cylindrical end pieces in space gap relation and with the rotating axes of the said end pieces lying in a horizontal plane normal to the said pole axes, coil windings about said poles and an electric circuit including said coil to establish a magnetic field between said pole ends of determined strength, a yoke connecting the pole ends remote from said space gap to form a substantially closed magnetic circuit about said gap, means to circulate a suspension of said materials vertically downwardly through the said space gap but out of direct contact with said pole ends, means to rotate said cylindrical pole ends about their axes in a direction towards each other in clockwise and counter-clockwise direction and downwardly, and means to separate the suspension into three streams as it passes out of the said magnetic field, two of said streams carrying the suspension flowing next adjacent the faces of said rotating pole ends and the third stream the suspension flowing intermediate the other two.

4. Apparatus for the electro-magnetic separation of material comprising an electro-magnet including a pair of electro-magnetic poles, each of said poles being provided with rotatable cylindrical pole ends, means to sustain said poles with their pole axes in alignment in a horizontal plane and with the said cylindrical end pieces in space gap relation with the rotating axes of the same in a horizontal plane normal to the said pole axes, coil windings about said poles, an electric circuit including said windings to establish a magnetic field of determined strength between said cylindrical pole ends and a yoke, means to form a closed magnetic circuit about said poles and coil windings, and means to circulate a suspension of said materials through the space gap between said cylindrical pole ends, but not in direct contact therewith, means to rotate said cylindrical pole ends towards each other in clockwise and counter-clockwise direction respectively, means to regulate the rate of flow of said suspension through said space gap, and means to separate the said suspension into three streams as it passes out of said magnetic field, two of said streams carrying the suspension flowing next adjacent said pole ends and the third stream carrying the suspension intermediate the two.

5. Apparatus for the electro-magnetic separation of materials comprising a rectangular container, means to sustain said container vertically, an electro-magnet including electro-magnetic poles, each having an arcuate recess in one end thereof and cylindrical shaped end pieces adapted to be received in said recesses and coil windings about said poles, means to sustain said poles in axial alignment adjacent opposite side walls of said container with the said cylindrical end pieces adjacent the said side walls with the cylindrical axes lying horizontally normal to the said pole axes, means to rotate said end pieces about said cylindrical axes towards each other in clockwise and counter-clockwise directions respectively, a yoke element horizontally disposed about said container and said poles and electrically connected to the ends of the said poles remote from the said recessed end, an electric circuit including said windings to induce a magnetic field in the space gap between said cylindrical end pieces and through said container, means to flow a suspension of said materials downwardly through the said container, means to obtain a hydrostatic head of pressure in said suspension, and means to separate said suspension into three separate flowing streams as it passes out of the said magnetic field, two of said streams carrying the suspension flowing along the container walls next adjacent the said end pieces and the third stream carrying the suspension intermediate the two.

6. In the apparatus of claim 5, means to regulate the horizontal mean free path of any particle in said suspension within said space gap except towards the side wall of the container adjacent the said rotating pole ends as said particle passes downwardly through the said magnetic field.

7. In the apparatus of claim 5, means to divide the said suspension into two streams as it enters the said magnetic field and means to limit the horizontal mean free path of the particles in said suspension except towards the side wall of the container adjacent the said rotating pole ends, as the said suspension passes downwardly through the said magnetic field.

8. In the apparatus of claim 5, arcuate recesses in the said opposite vertical side walls of the said container, said recesses being adapted to receive said cylindrical end pieces with the rotating surfaces thereof in relatively close spaced relation to the surfaces of said recesses, means to divide the said suspension into two streams as it enters the said magnetic field and to direct the flow thereof onto the top of said arcuate recess, and means to limit the horizontal mean free path of the particles of said suspension except towards the recessed side walls of the container as they pass downwardly though the said magnetic field.

9. Apparatus for electro-magnetically separating materials comprising a pair of electro-magnets each having symmetrically shaped pole pieces one end of each being arcuately recessed and cylindrical shaped end pieces adapted to be seated within said recesses, a magnet winding about each of said pole pieces, and an electric circuit including said windings for inducing a determined magnetic field in said pole pieces, means to sustain the said magnets with the pole axes in horizontal alignment and a magnetic gap between said recessed ends, means to sustain said cylindrical end pieces within said recesses with the cylindrical axes in a horizontal plane normal to the said pole axes and a spaced gap therebetween, means to rotate said cylindrical end pieces towards each other about said cylindrical axes with the left and right end pieces moving in clockwise and counter-clockwise direction respectively, a yoke member surrounding said magnets and disposed in substantially the same horizontal plane therewith and electrically connecting the outside ends of said poles and providing thereby a closed magnetic circuit, a rectangular container enclosing the space gap between said cylindrical pole ends, means to flow a suspension of materials downwardly through said container, means to place said suspension under hydrostatic pressure, means to limit the horizontal mean free path of the particles in said suspension except towards the inner surface of the container next adjacent said pole ends, and means to separate the said suspension into three flowing streams as the suspension passes downwardly out of said magnetic field, two of said streams carrying the suspension flowing along each of said side walls next adjacent the said pole ends and the third carrying the suspension flowing intermediate the said two streams.

10. The method of electro-magnetically separating materials which comprises forming a suspension of said materials in a fluid medium, flowing said suspension under a hydrostatic head of pressure vertically downward in a container through an electro-magnetic field projected through the suspension transversely of the direction of flow thereof, between electro-magnetic poles disposed adjacent the exterior walls of said container, moving the magnetically attracted particles along the inner walls of said container in the direction of flow of said suspension through the said magnetic field, and separating the suspension into three streams as the suspension passes out of said field, two of said streams carrying the suspension flowing nearest the said magnetic poles and the third stream carrying the suspension flowing intermediate the same.

11. Apparatus for magnetically separating materials comprising a container, means to flow a suspension of materials under hydrostatic pressure through said container, means to magnetically attract the magnetic particles of said suspension to opposite side walls of said container, means to progressively move said magnetic particles along said side walls in the direction of flow of said suspension to a point on said surface where the said magnetically attracting means fails to operate to retain said particles adjacent the said walls, and means to direct the said magnetic particles as they become released from the said side walls into separate channels of flow of said suspension each of said channels carrying but a relatively small proportion of said suspension as compared to the main flow thereof.

12. Apparatus for magnetically separating materials comprising a vertically sustained container of substantially rectangular cross-section, means to flow a suspension of said materials under hydrostatic pressure downwardly through said container, means to project a magnetic field of desired strength horizontally through said container between opposite vertical walls thereof, means to progressively move the magnetically attracted particles of said suspension downwardly along the inner faces of said opposite walls and out of said magnetic field, and means to separate the flowing suspension into three separate streams as the suspension passes out of said field, two of said streams carrying the suspension flowing adjacent the said opposite walls together with the magnetically attracted particles downwardly moving along the inner face of said wall and the third stream carrying the main body of the suspension flowing intermediate the first two streams.

13. An electro-magnetic separator device comprising a rectangular container vertically sustained, an electro-magnet including a pair of pole pieces disposed horizontally in axial alignment with one end of each adjacent opposite sides of said container, an arcuate recess in said ends the axes of said recesses lying in a horizontal plane normal to said pole axes, cylindrical end sections seated in each of said recesses each of said end sections being adapted to be rotated about its cylinder axis in clockwise and counter-clockwise direction towards each other and downwardly, a coil winding on each of said poles, an electrical circuit including said winding to energize said poles and to establish a magnetic field of determined strength between said cylindrical end sections through the said container, a pair of partitions in the bottom of said container forming three separate compartments therein, said partitions extending vertically upward from said side walls adjacent which the said poles are disposed and the spacing downwardly away from opposite to those adjacent which the said poles are located, the upper edges of said partitions being adjustable vertically and horizontally to regulate the spacing of the said edge from the said side walls adjacent which the said poles are disposed and the spacing downwardly away from the said pole axes, valved openings in the bottom of each of said compartments adapted to regulate the rate of flow of a suspension through said container and feed means to supply a continuous flow of a suspension of said materials into the top of said container.

EDWIN E. ELLIS.
AUGUSTIN LEON JEAN QUENEAU.